July 2, 1963     J. BRAUNBECK     3,096,387
RADIOACTIVITY DETECTION TRAINING
Filed April 6, 1960
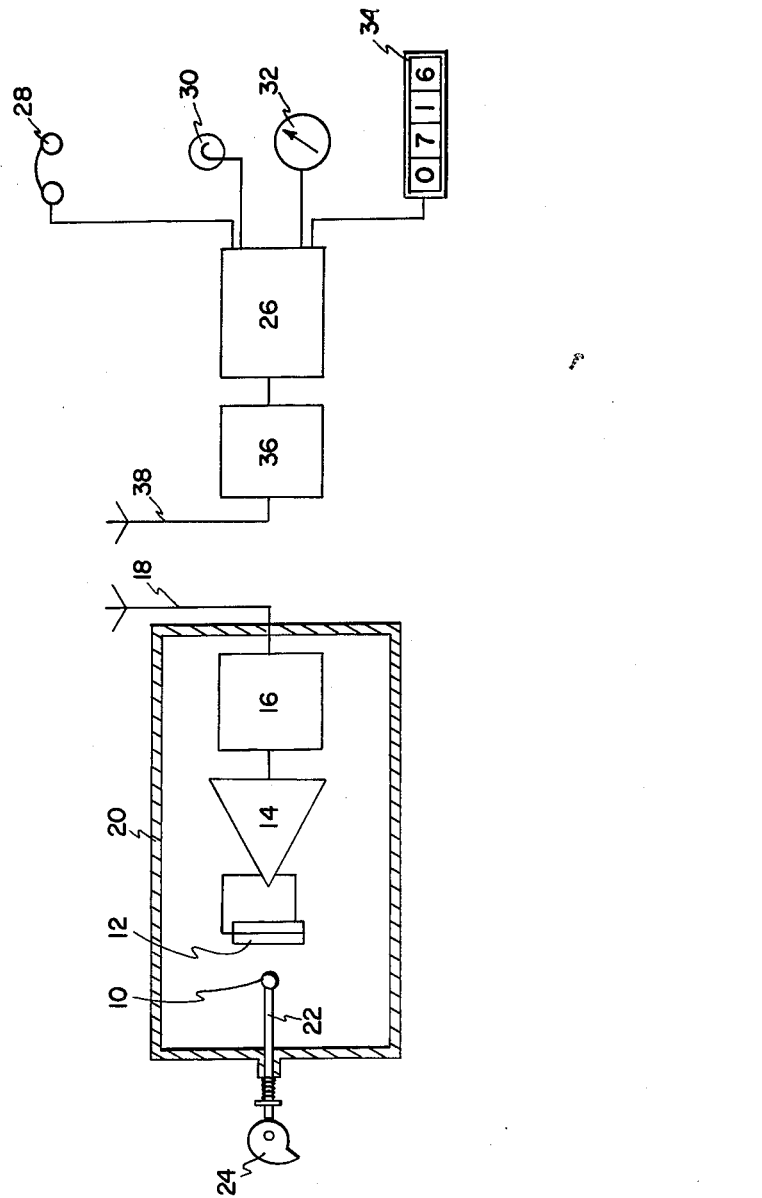
INVENTOR.
JOSEF BRAUNBECK
BY
ATTORNEY

United States Patent Office 3,096,387
Patented July 2, 1963

3,096,387
RADIOACTIVITY DETECTION TRAINING
Josef Braunbeck, Uberlingen (Bodensee), Germany, assignor to Bodenseewerk Perkin-Elmer & Company, Uberlingen (Bodensee), Germany
Filed Apr. 6, 1960, Ser. No. 20,449
1 Claim. (Cl. 35—10.4)

This invention relates to method and apparatus for training in radioactivity detection.

In the past it has not been possible to train personnel in the use of radiation detection devices, such as scintillation or Geiger-Müller counters, under realistic conditions. Sources having radioactivity levels equivalent to those that might be encountered in case of war or industrial emergency are not only expensive and difficult to handle but are also dangerous to life. It is highly important, however, that personnel most apt to be exposed to such radiation hazards be trained to recognize their existence. Such personnel might include, for example, spotting, rescue, and decontamination teams attached to industry, the armed forces, and civil defense organizations; shipboard damage control teams; and aircrew members apt to be exposed to airborne radiation.

It is, therefore, the primary object of the present invention to simulate high-level radioactivity detection.

Other objects are to simulate such radioactivity with a low level source; to easily vary the degree of simulated exposure in accordance with any prearranged plan; to simulate such radioactivity with a high degree of fidelity; and to simulate such radiation in such a manner that the person being trained will utilize standard detection components.

The above objects are accomplished by detecting the radioactivity from a relatively low-level source and forming signals responsive to the radioactivity. The signals are controlled by varying the distance between the low level source and its detector by predetermined amounts. The signals are then measured by standard means.

The operation of the invention will be more apparent from the following description and appended claims taken in conjunction with the single FIGURE of the attached drawing which is a schematic illustration of an apparatus suitable for use therein.

In accordance with the invention, a radioactive source 10 is provided in close relationship to a suitable counter, such as a counting tube 12. Source 10 may consist of a weak and, therefore, harmless radioactive substance. For example, this source may have a radiation level comparable to that of a luminous watch dial. By putting such a low-level source in close proximity to the radiation detector, the result obtained is comparable to the effect produced by a higher intensity at a greater distance. For example, if source 10 has a radioactivity of $10^{-5}$ Curie and is placed 1 cm. from the counting tube 12, the resulting impulse frequency corresponds to that of a 10 Curie source at a distance of 10 meters.

The signals supplied by counting tube 12 may be fed into an amplifier 14 and the amplified signal may be transmitted by a transmitter 16 having a sending antennae 18. This assembly may be housed in a suitable container 20. Source 10 may be mounted on a movable rod 22 which may be controlled by hand or by any suitable mechanism such as a cam disk 24.

The person undergoing training is provided with a simulated radiation measuring device 26 which may include any type of detection equipment such as a headphone 28, a light 30, a counts per minute indicator 32, and a register 34. A receiver 36, including a receiving antenna 38, is tuned to transmitter 16 and supplies the detection equipment with a frequency count corresponding to that received by counting tube 12. In order to increase the realistic nature of the training, receiver 36 and antenna 38 may be constructed to have the external appearance of a counting tube probe.

It will be apparent to those skilled in the art that a number of variations may be employed in the method and apparatus of this invention without departing from the scope thereof. For example, in many cases it may be desirable to transmit the counting impulses by cable rather than by wireless means. Such a variation might find use in conjunction with a flight simulator to simulate flights through radioactive clouds or with stationary radioactivity supervision posts for indicating changes in radiation level. It will also be noted that the distance between the source and the counting tube may be adjusted as desired for a particular problem. For example, the cam disk 24 may be designed and rotated so as to initiate the exponential decay of radioactivity in the presence of short-life fission products.

This invention is to be construed as limited only by the scope of the following claim.

I claim:

Apparatus for simulating measurement of relatively high-level radioactivity which comprises nuclear radiation counting tube means; relatively low-level radioactive source means in energizing relationship thereto and at a variable-distance therefrom; means for moving said source means with respect to said counting tube means to vary the energizing relationship therebetween; simulated radiation detector means including radio receiving antenna means; and signal transmitting means including radio transmitting antenna means responsive to the signals produced by said counting tube means and adapted to supply said signals to said receiving antenna means and said simulated detector means.

References Cited in the file of this patent
UNITED STATES PATENTS 2,633,648    Amman               Apr. 7, 1953
2,900,740    Brault                Aug. 25, 1959